United States Patent [19]

Maeda

[11] Patent Number: 4,633,154
[45] Date of Patent: Dec. 30, 1986

[54] BRAKING METHOD, BRAKING CIRCUIT AND SPEED CONTROL APPARATUS FOR A DC MOTOR

[75] Inventor: Junji Maeda, Kyoto, Japan

[73] Assignee: Sanyo Electric Co., Ltd., Osaka, Japan

[21] Appl. No.: 675,067

[22] Filed: Nov. 26, 1984

[30] Foreign Application Priority Data

Dec. 2, 1983 [JP] Japan ................................. 58-228863

[51] Int. Cl.⁴ .............................................. H02P 3/10
[52] U.S. Cl. ..................................... 318/373; 318/254; 318/331; 318/368; 318/459
[58] Field of Search ............... 318/301, 310, 311, 312, 318/313, 326, 331, 373, 374, 138, 139, 254 A, 254, 368, 459; 363/20, 21

[56] References Cited

U.S. PATENT DOCUMENTS

| 3,521,139 | 7/1970 | Kendall | 318/373 X |
| 3,748,552 | 7/1973 | Arthur | 318/373 X |
| 3,833,846 | 9/1974 | Schmalzriedt | 318/374 X |

FOREIGN PATENT DOCUMENTS

| 2439068 | 2/1975 | Fed. Rep. of Germany | 318/373 |
| 2443998 | 5/1975 | Fed. Rep. of Germany | 318/373 |
| 56-38986 | 4/1981 | Japan | 318/326 |
| 58-163288 | 9/1983 | Japan | 318/331 |
| 0758454 | 8/1980 | U.S.S.R. | 318/331 |
| 0983956 | 12/1982 | U.S.S.R. | 318/331 |

*Primary Examiner*—William M. Shoop, Jr.
*Assistant Examiner*—Bentsu Ro
*Attorney, Agent, or Firm*—Wenderoth, Lind & Ponack

[57] ABSTRACT

A braking method for DC motor of the present invention is applied to a pulse-driven DC motor. A counter electromotive force of reverse polarity to driving pulses which is generated by induction at the winding of the DC motor is charged in a capacitor. The charged counter electromotive force is fed to the winding of the DC motor during the time that the driving pulses are not fed to the motor, so that plugging is applied to the DC motor. Thus, an external power source for plugging is not necessary, and power consumption is reduced and the construction of the braking circuit becomes very simple. Also, the driving period and the plugging period have a complementary relationship therebetween, thereby enabling the accurate controlling of the rotational speed of the DC motor with a very simple circuit.

7 Claims, 4 Drawing Figures

BRAKING METHOD, BRAKING CIRCUIT AND SPEED CONTROL APPARATUS FOR A DC MOTOR

BACKGROUND OF THE INVENTION

1. Field of the Invention

This invention relates to a braking method, a braking circuit and a speed control apparatus for a DC motor which is pulse-driven, and more particularly to a braking method, a circuit therefor and control apparatus for a DC motor which is capable of plugging without requiring an external braking current.

2. Description of the Prior Art

A pulse driving method has been well known as one drive control method for a DC motor, which is advantageous in that its drive circuit has less electrical losses and is controllable by use of a digital signal from a computer or the like. This method generally employs a servo system for detecting rotation of the motor by a rotary encoder or the like so as to control the rotational speed of the motor so as to be a set value on the basis of an output of the encoder. In other words, when the rotational speed of the motor is smaller than the set value, a duty ratio of the driving pulse is enlarged so as to increase a mean value of voltage fed to the DC motor, thereby raising the rotational speed thereof. On the other hand, when the rotational speed of the DC motor exceeds the set value, some method is used to apply braking to the DC motor.

Now, the braking method for the motor and a rotary system driven thereby, is roughly sorted into the mechanical method and electrical method.

The electrical method is different from the mechanical one in that it has the advantage of avoiding wear, heating and damage of the braking.

There are three typical methods for electrically braking the motor.

With dynamic braking, the motor is operated as a generator by cutting off the power supply to the running motor, and the kinetic energy of the motor, which is rotating by inertia, is converted into electrical energy, and the electrical energy is fed to a resistance, thereby being converted into thermal energy and dispersed.

With regenerative braking, the kinetic energy of a rotor, in the same fashion as the aforesaid dynamic braking, is converted into electrical energy which is then returned to a power source, thereby being fed to other loads.

With plugging a current flows in the winding of motor in the reverse direction to that when the motor is driven, thereby generating a torque in a direction which is opposite to the rotation direction of the motor. In other words, the motor is driven so as to rotate reversely, thereby being braked.

The above methods are properly selectively used in dependance upon the purpose of using the motor. The present invention applies the plugging method, but in a case of controlling the rotational speed of the motor by plugging, a braking current should be externally supplied and also of the supplied current should be strictly controlled, whereby the plugging method is defective in that a special apparatus for strict current control is required.

OBJECT OF THE INVENTION

In the light of the above matters, this invention has been designed. A first object of the invention is to provide a braking method and a circuit therefor, for a pulse-driven DC motor, which are capable of carrying out plugging without requiring a special external braking current.

A second object of the invention is to provide a braking method and a circuit therefor, for a pulse-driven DC motor, which can accurately control the rotational speed of the motor.

A third object of the invention is to provide a braking method and a circuit therefor, for a pulse-driven DC motor, which are simple in construction so as to accurately control the rotational speed of the motor.

A fourth object of the invention is to provide a speed control apparatus for a pulse-driven DC motor.

The above and further objects and features of the invention will more fully be apparent from the following detailed description with reference to accompanying drawings.

DETAILED DESCRIPTION OF THE INVENTION

Figure 1:
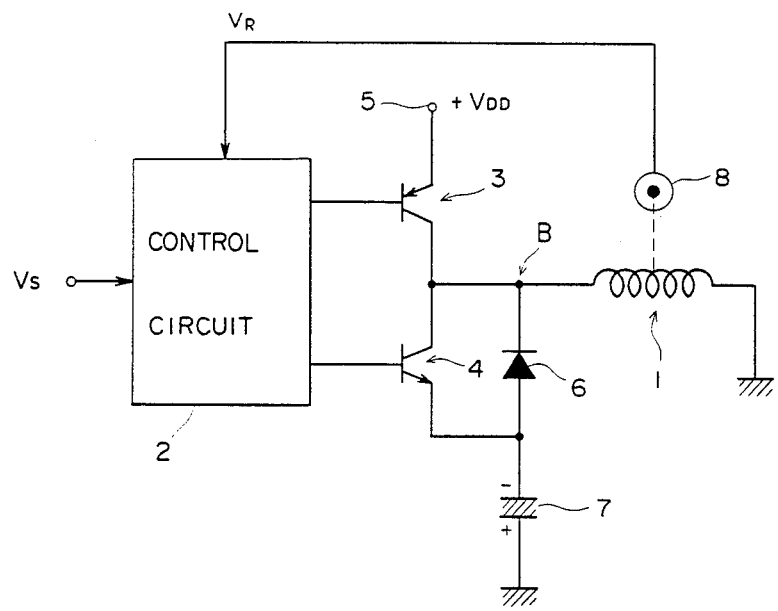
FIG. 1 is a circuit diagram of a braking circuit of a DC motor in accordance with the present invention.

Referring to FIG. 1, a control circuit 2 controls the DC voltage supplied to the winding 1 of a DC motor pulse-driven.

The control circuit 2 serves to control the rotational speed of the DC motor so as to correspond to a set value $V_S$ and is connected to two switching elements using transistors. The first switching transistor 3 (PNP type) has its base connected to the control circuit 2, and has its emitter connected to a power supply terminal 5 for providing a supply voltage ($+V_{DD}$), and has its collector connected to one end of winding 1 whose other end is grounded. Accordingly, the first switching transistor 3, when given a control signal from the control circuit 2, becomes conductive so that power is supplied to the winding 1 through the first switching transistor 3 from the power supply terminal 5, thereby pulse-driving the DC motor.

On the other hand, the second switching transistor 4 (NPN type) has its base connected to the control circuit 2, and has its collector connected to one end of winding 1 at the first switching transistor 3 side, and has its emitter connected to one end of a capacitor 7 whose other end is grounded. A diode 6 has its cathode connected to one end of winding 1 at the first and second switching transistors 3 and 4 side, and has its anode connected to the non-grounded terminal of capacitor 7.

In addition, the conduction of transistors 3 and 4 are controlled by control circuit 2 so that their conduction is complementarily.

A rotary encoder 8 serves to detect the rotational speed of the DC motor and outputs a servo signal to the control circuit 2. Also, the control circuit 2 controls a duty ratio of the first switching transistor 3 so that the rotational speed of the DC motor is controlled so as to be a preset value on the basis of the output signal from the rotary encoder 8. Hence, the rotary encoder 8 constitutes a servo system for the control of rotational speed of the DC motor.

Figure 2:
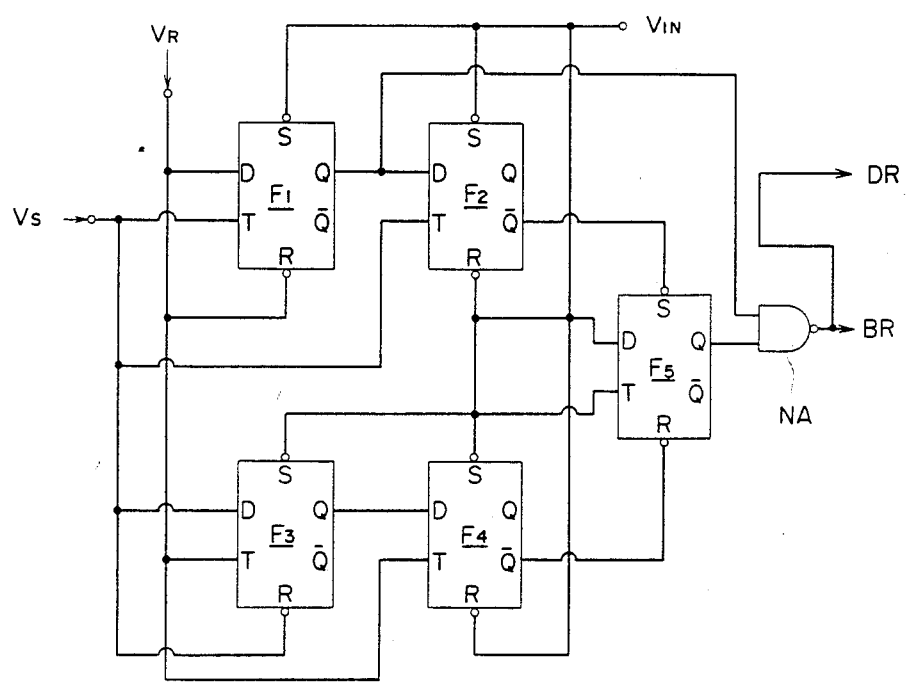
FIG. 2 is a circuit diagram of a control circuit of the braking circuit.
Figure 3:
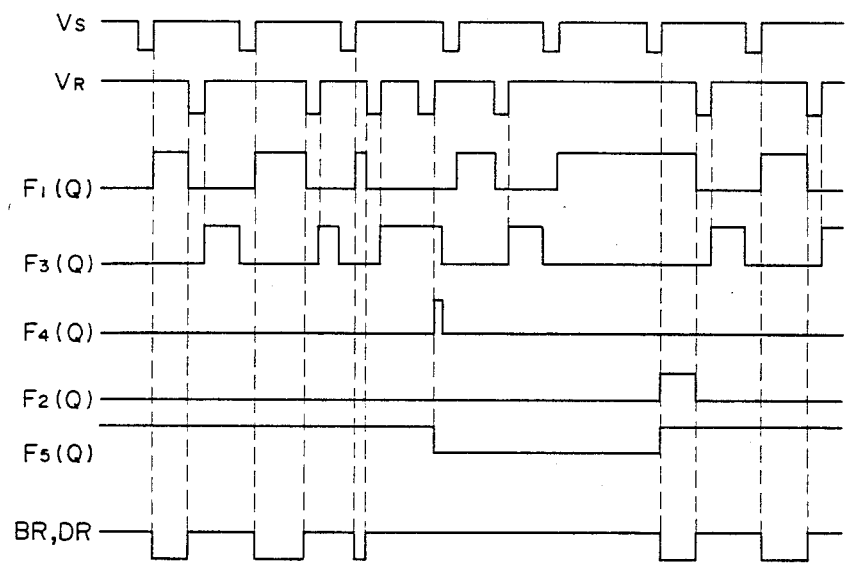
FIG. 3 is a timing chart explanatory of the control circuit.

FIG. 2 is a block diagram of the control circuit 2 and FIG. 3 is a timing chart explanatory of operation of the same, in which a setting signal $V_S$ for setting the rotational speed of the DC motor (the pulse cycle period sets the rotational speed) is fed to the trigger terminals T, T of first and second D (Delay)-flip-flops $F_1$ and $F_2$, and the data terminal D and reset terminal R of a third D-flip-flop $F_3$. On the other hand, the output signal from the rotary encoder 8, that is-a detecting signal $V_R$ for the rotational speed of DC motor (a pulse signal having a cycle period which is proportional to the rotational speed of DC motor), is given to the data terminal D and reset terminal R of the first D-flip-flop $F_1$, and the trigger terminals T, T of the third and fourth D-flip-flops $F_3$ and $F_4$ respectively.

An output from the Q terminal of the first D-flip-flop $F_1$ is fed to one input terminal of a NAND gate NA and the data terminal D of the second D-flip-flop $F_2$, and an output from the $\overline{Q}$ terminal of the second D-flip-flop $F_2$ is fed to the set terminal S of a fifth D-flip-flop $F_5$. On the other hand, an output from the Q terminal of the third D-flip-flop $F_3$ is fed to the data terminal D of the fourth D-flip-flop $F_4$, and an output from the $\overline{Q}$ terminal of the fourth D-flip-flop $F_4$ is fed to the reset terminal R of the fifth D-flip-flop $F_5$. An output from the Q terminal of the fifth D-flip-flop $F_5$ is fed to the other input terminal of NAND gate NA.

The output of NAND gate NA is fed as a high active braking signal BR to the base of the second switching transistor 4 and also as a low active driving signal DR to the base of the first switching transistor 3.

In addition, the set terminals S, S of the first and second D-flip-flops $F_1$ and $F_2$, and the data terminal D of the fifth D-flip-flop $F_5$ and the reset terminal R of the fourth D-flip-flop $F_4$, are connected to a terminal $V_{IN}$ which receives an initial condition setting signal.

Next, an explanation will be given an operation of the control circuit 2.

It is to be noted that the S and R terminals of the D-flip-flops $F_1$-$F_5$ are low active terminal as shown in FIG. 2.

When $V_s$ is supplied at the time that the motor stops, the Q outputs of flip-flops $F_1$ and $F_2$ become a high level, for $V_R$ is at a high level and $V_s$ is the only input data. Accordingly, the Q output of flip-flop $F_5$ becomes a high level and DR is kept at low level.

When the speed increases and becomes almost a constant value, which is determined by the frequency of $V_s$, the number of pulses of $V_R$ becomes equal to two in a cycle of $V_s$. At this condition, the Q outputs of flip-flops $F_1$ and $F_2$ become a low level and the Q output of flip-flops $F_3$ and $F_4$ becomes a high level, and DR is kept at a high level.

In sum, from the operation noted above, DR is always at a low level (i.e.-the motor is always driven) while the load is extremely heavy and DR becomes independent of $V_s$ while the load is extremely light.

The output from the Q terminal of the first D-flip-flop $F_1$ is synchronized with the leading edge of the setting signal $V_S$ so as to have the same level as the detected signal $V_R$ (usually a high level) and then is reset by the trailing edge of the detecting signal $V_R$ so as to have a low level; the output of the Q terminal of the first D-flip-flop $F_1$ is fed to the data terminal D of the second D-flip-flop $F_2$. The second D-flip-flop $F_2$ delivers the $\overline{Q}$ terminal inverted level output to the input to the data terminal D (the Q terminal output of first D-flip-flop $F_1$) at the leading edge of setting signal $V_S$ fed to the trigger terminal T thereof. Therefore, the output from the $\overline{Q}$ terminal of the second D-flip-flop $F_2$, when fed a single pulse of detecting signal $V_R$ per single pulse of setting signal $V_S$, keeps a high level (the Q terminal output has a low level), but when fed no pulse of detecting signal $V_R$ for one cycle period of setting signal $V_S$, is synchronized with the leading edge of setting signal $V_S$ so as to be switched to a low level (where the Q terminal output has a high level) because the first D-flip-flop $F_1$ is not reset. $F_2$ stores the fact that the power for the motor is insufficient and the speed is lower than the constant speed which $V_s$ determines. If the pulse of $V_R$ is delayed as compared with that of $V_s$, and no pulse exists in one cycle of $V_s$, then the Q output of flip-flop $F_2$ becomes a high level.

On the other hand, the output from the Q terminal of the third D-flip-flop $F_3$, conversely to the first D-flip-flop $F_1$, is synchronized with the leading edge of detecting signal $V_R$ so as to have the same level as the setting signal $V_S$ (usually a high level) and is reset by the trailing edge of setting signal $V_S$ so as to have the low level. The output from the Q terminal of the third D-flip-flop $F_3$ is fed to the data terminal D of the fourth D-flip-flop $F_4$. The fourth D-flip-flop $F_4$ delivers an inverted level output from the $\overline{Q}$ terminal to the input of the data terminal D (the Q terminal output of the third D-flip-flop $F_3$) on the leading edge of the detecting signal $V_R$ fed to the trigger terminal T thereof. Therefore, the output from the $\overline{Q}$ terminal of the fourth D-flip-flop $F_4$, when fed a single pulse in the setting signal $V_S$ per single pulse of detecting signal $V_R$, keeps the high level (where the Q terminal output has the low level), but when it has not received a pulse from the setting signal $V_S$ for one cycle period of detecting signal $V_R$, is synchronized with the leading edge of detecting signal $V_R$ so as to be switched to the low level (where the Q terminal output has the high level) because the third D-flip-flop $F_3$ is not reset. $F_4$ stores the fact that the power for the motor is excessive, and the speed is higher than the constant speed which $V_s$ determines. If the pulse of $V_R$ is advanced as compared with that of $V_s$, and the two pulses exist in one cycle of $V_s$, then the Q output of flip-flop $F_4$ becomes a high level.

Accordingly, the fifth D-flip-flop $F_5$, when the control circuit 2 is alternately fed a single pulse of setting signal $V_S$ and detecting signal $V_R$, is kept in a set condition and the output from the Q terminal of the flip-flop $F_5$ is kept in a high level, whereby the output of NAND gate NA has an inverted level with respect to the output of the Q terminal of first D-flip-flop $F_1$. The output of NAND gate NA is fed as the braking signal BR to the second switching transistor 4, thereby applying to the motor the braking action during the high level of the signal BR, and also as the driving signal DR to the first switching transistor 3 so that the DC motor is driven during the low level of the signal DR, in which the output from the Q terminal of first D-flip-flop $F_1$ has the high level for the time period corresponding to a time lag of each trailing edge of detecting signal $V_R$ to each leading edge of setting signal $V_S$. Accordingly, when the time lag is larger (or smaller), in other words, when the rotational speed of DC motor is smaller (or larger) than the set value, the time period of the high level output from the NAND gate NA becomes shorter (or longer), whereby the actual rotational speed of DC motor is controlled in the direction of approaching the set value.

Now, in a case where the rotational speed of DC motor increases to an extent that two pulses of detecting signal $V_R$ occur during one pulse cycle period as shown at the left side of the center in FIG. 3, the output from the $\bar{Q}$ terminal of the fourth D-flip-flop $F_4$ is switched so as to have a low level (where the Q terminal output has a high level) and is then fed to the reset terminal R of the fifth D-flip-flop $F_5$. Hence, the output from the Q terminal of fifth D-flip-flop $F_5$ has a low level so that the output of NAND gate NA has a high level regardless of the level of Q terminal output from the first D-flip-flop $F_1$, thereby continuously applying the braking action on the DC motor.

Conversely, in a case where the rotational speed of DC motor decreases to an extent that two pulse of setting signal $V_S$ occur for one pulse cycle period of detecting signal $V_R$ as shown at the right side of the center in FIG. 3, the output of $\bar{Q}$ terminal of the second D-flip-flop $F_2$ has a low level (where the Q terminal output has a high level) and is then fed to the set terminal S of the fifth flip-flop $F_5$. Hence, the output of Q terminal at the fifth flip-flop $F_5$ is kept at the high level and the first flip-flop $F_1$ keeps its output of Q terminal at a high level until the leading edge of high level of detecting signal $V_R$ subsequently is fed to the reset terminal R of the flip-flop $F_1$. Accordingly, for this period, since the output of NAND gate NA is kept at a high level, the DC motor can be driven continuously. When one pulse of $V_R$ exists in one cycle of $V_s$, a constant speed is attained. The delay time from the pulse of $V_s$ to that of $V_R$ depends on the load and the necessary power is supplied.

With respect to the left side of FIG. 3, as the speed increases, the Q output of flip-flop $F_4$ becomes a high level. With respect to the right side of FIG. 3, as the speed decreases, the Q output of flip-flop $F_2$ becomes a high level.

Next, explanation will be given on the braking method of the invention carried out by the circuit noted above, in accordance with a timing chart in FIG. 4.

Figure 4:
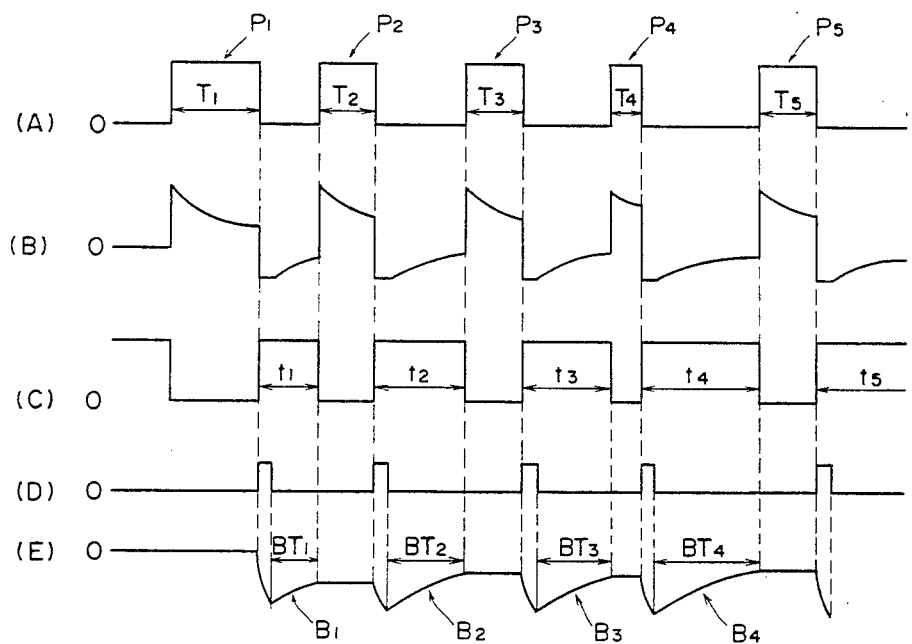
FIG. 4 is a timing chart explanatory of the operation in accordance with the present braking circuit for the DC motor of the invention.

At first, in order to rotate the DC motor, the control circuit 2 supplies to the base of the first switching transistor 3 a control signal of the period corresponding to the set value $V_S$. In FIG. 4-(A), references $T_1$, $T_2$ and $T_3$ each represent the period, in which when the first switching transistor 3 is conductive for the period $T_1$, $T_2$ or $T_3$, the power supply terminal 5 feeds supply voltage $V_{DD}$ as the driving pulses $P_1$, $P_2$ and $P_3$ to the winding 1, so that the rotor (not shown) of DC motor rotates in the direction in accordance with the polarity (to be hereinafter positive) of each driving pulse $P_1$, $P_2$ or $P_3$.

Thus, when the first switching transistor 3 is conductive to feed to the winding 1 the supply voltage $+V_{DD}$ as the driving pulses $P_1$, $P_2$, ... respectively, potential at the node B of winding 1 at the power supply terminal 5 side and given the driving pulse $P_1$, $P_2$, ... changes as shown in FIG. 4-(B). In other words, the potential at the node B rises steeply in synchronism with the turning ON of the first switching transistor 3, and thereafter gradually lowers and steeply lowers in synchronism with the turning OFF of the first switching transistor 3. The inductance of winding 1, following the trailing edge of potential, generates a counter electromotive force of reverse polarity with respect to the driving pulse, in other words, of a negative potential at the power supply terminal 5 (the node B) side of the winding 1. Since the counter electromotive force is of a negative potential at the power supply terminal 5 (node B) side of the winding 1, the diode 6, whose cathode is connected to the node B side end of winding 1, is conductive as shown in FIG. 4-(D). Hence, the capacitor 7, which is connected at one end to the anode of diode 6, is charged with a negative potential at the anode side of diode 6 as shown in FIG. 4-(E).

The counter electromotive force of a negative potential from the winding 1, which is charged into the capacitor 7, as shown in FIG. 4-(C), is fed to the winding 1 during the conduction of the second switching transistor 4, which is on or off in a complementarily fashion with respect to the first switching transistor 3. In other words, during the time period $t_1$ (or $t_2$, $t_3$ ... ) from the end of the period $T_1$ (or $T_2$, $T_3$ ... ) in which the first switching transistor 3 is on to the start of the next period $T_2$ (or $T_3$, $T_4$ ... ), the second switching transistor 4 is on. For each time period $t_1$, $t_2$, $t_3$ ... , the negative electric charge charged in the capacitor 7 is fed as braking power $B_1$, $B_2$ ... to the winding 1 through the second transistor 4.

Here, it is to be noted that the driving pulse $P_1$, $P_2$ ... supplied to the winding 1 from the power supply terminal 5 when the first switching transistor 3 is on and the braking power $B_1$, $B_2$ ... supplied to the winding 1 from the capacitor 7 when the second switching transistor 4 is on, have a relationship of reverse polarity with respect to each other. As a result, currents of reverse polarity with respect to each other are fed alternately to the winding 1, so that when the braking power $B_1$, $B_2$ ... is fed, torque in the reverse direction to the feeding of driving pulse $P_1$, $P_2$ ... is applied to rotate the rotor of DC motor, resulting in the motor being subjected to plugging.

The plugging will continue until the first switching transistor 3 subsequently is on (simultaneously, the second switching transistor 4 is off). When the first transistor 3 is on, the winding 1 is fed the driving pulse of positive potential, the pulse width of driving pulse being decided by the control circuit 2 by whether the rotational speed of the DC motor, as detected by the rotary encoder 8, is larger or smaller than the set value. For example, a second driving pulse $P_2$, as shown in FIG. 4-(A), is reduced in pulse width in comparison with the driving pulse $P_1$ because the rotational speed of the DC motor driven by the pulse $P_1$ is detected to be larger than the set value. Accordingly, the number of rotations of DC motor caused by the second driving pulse $P_2$ of such reduced pulse width decreases. On the contrary, the time $t_2$ of conduction of the second transistor 4 after the trailing edge of driving pulse $P_2$ becomes longer than the aforesaid conduction time $t_1$, thereby increasing the time of discharging negative potential from the capacitor 7 to the winding 1. In other words, the time period of plugging becomes longer so that the rotational speed of the DC motor is increased by the driving pulse $P_1$ and rapidly approaches the set value due to the synergistic effect of reduction of pulse width of the second driving pulse $P_2$ and an increment in the plugging time.

Thereafter, the braking power of negative potential charged in the capacitor 7, as abovementioned, is fed to the winding 1 at each time a single shot of each driving pulse is given to the winding 1, thereby applying the plugging to the DC motor.

In addition, the time for applying the plugging to the DC motor, in other words, the time for feeding negative potential from the capacitor 7 to the winding 1 is decided by the control circuit 2 on the basis of the rotational speed of the DC motor caused by the driving pulse applied just before and detected by the rotary encoder 8. As a result, the period $BT_1$, $BT_2$, $BT_3$ ... of applying the plugging, as shown in FIG. 4-(E), when pulse width of each driving pulse output just before is longer, is controlled in a short time period, and, when shorter, in a long time period, thereby controlling the rotational speed of the DC motor so as to always coincide with the set value.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method of braking a pulse-driven DC motor which comprises:
   charging a capacitor connected to a winding of said DC motor having a counter electromotive force generated in said winding of said DC motor after a driving pulse is fed to said winding, said capacitor being charged with a reverse polarity with respect to said driving pulse, and
   applying plugging to said DC motor by feeding said counter electromotive force charged in said capacitor to said winding during an absence of said driving pulse.

2. A method of braking for a pulse-driven DC motor as set forth in claim 1, wherein the feeding period of the driving pulse and the feeding period of the charged counter electromotive force have a complementary relationship therebetween.

3. A braking circuit for a pulse-driven DC motor comprising:
   a capacitor connected to a winding of said DC motor;
   a diode interposed between said capacitor and said winding so as to charge said capacitor with a counter electromotive force generated in said winding after the feeding of a driving pulse to said winding; and
   a switching element interposed between said capacitor and said winding so as to feed said counter electromotive force charged in said capacitor to said winding;
   wherein said capacitor discharges its electrical charge and said discharged electrical charge is fed to said winding with a reverse polarity with respect to said driving pulse by switching on said switching element in the absence of said driving pulse so that plugging is applied to said DC motor.

4. A braking circuit for a pulse-driven DC motor as set forth in claim 3, wherein said control circuit switches on said switching element complementarily to the feeding period of said driving pulse.

5. A speed control apparatus for a pulse-driven DC motor comprising:
   a rotational speed detecting device for detecting the rotational speed of said DC motor;
   a circuit for generating a driving pulse whose duty ratio corresponds to a difference between a speed setting signal for said DC motor and a detected speed signal from said speed detecting device;
   a capacitor connected to a winding of said DC motor;
   a diode interposed between said capacitor and said winding so as to charge said capacitor with a counter electromotive force generated in said winding after the feeding of a driving pulse to said winding;
   a switching element interposed between said capacitor and said winding so as to feed said counter electromotive force charged in said capacitor to said winding; and
   a switching element control circuit for switching on said switching element at a proper time.

6. A speed control apparatus for a pulse-driven DC motor as set forth in claim 5, wherein said switching element control circuit switches on said switching element each time that the feeding of said driving pulse finishes.

7. A speed control apparatus for a pulse-driven DC motor as set forth in claim 6, wherein said switching element control circuit switches on said switching element complementarily to the feeding period of said driving pulse.

* * * * *